(12) United States Patent
Read, Jr.

(10) Patent No.: US 6,257,792 B1
(45) Date of Patent: Jul. 10, 2001

(54) RETAINING RING

(75) Inventor: Dennis M. Read, Jr., Houston, TX (US)

(73) Assignee: Camco International Inc., Houston, TX (US)

( * ) Notice: Subject to any disclaimer, the term of this patent is extended or adjusted under 35 U.S.C. 154(b) by 0 days.

(21) Appl. No.: 09/276,592

(22) Filed: Mar. 25, 1999

Related U.S. Application Data (60) Provisional application No. 60/079,644, filed on Mar. 27, 1998.

(51) Int. Cl.[7] .......................... E21B 17/02; E21B 17/046
(52) U.S. Cl. ........................ 403/16; 403/344; 403/329; 166/242.6
(58) Field of Search .................................. 403/344, 326, 403/329, 338, 16, 335, 336, 340, 374.3; 166/242.6; 175/325.2; 285/415, 419, 404, 90

(56) References Cited

U.S. PATENT DOCUMENTS

| | | |
|---|---|---|
| 272,191 | 2/1883 | Baumann . |
| 297,264 | 4/1884 | Hunt . |
| 509,129 | 11/1893 | Johnson . |
| 725,707 | 5/1903 | Stauffer et al. . |
| 751,329 | 2/1904 | McLaughlin . |
| 973,532 | 10/1910 | McLaughlin . |
| 1,649,752 | 11/1927 | Stone . |
| 2,547,263 | 4/1951 | Heimann et al. . |
| 2,796,648 | 6/1957 | Peterson . |
| 3,229,998 | 1/1966 | Pennington . |
| 3,464,307 | 9/1969 | Wurzel . |
| 3,765,707 | 10/1973 | Westberg . |
| 4,118,838 | 10/1978 | Schiefer et al. . |
| 4,226,164 | 10/1980 | Carter . |

(List continued on next page.)

OTHER PUBLICATIONS

Interlocking external series 5107; Waldes TRUARC Retaining Rings.

8 Fastener Comparisons; Waldes TRUARC Retaining Rings, pp. 6–19; copyright 1961 McGraw–Hill Publishing Co.

Primary Examiner—Lynne H. Browne
Assistant Examiner—John R. Cottingham
(74) Attorney, Agent, or Firm—Goldstein & Polasek, L.L.P.

(57) ABSTRACT

The invention is directed to a retaining ring for securing components along a shaft by transferring the compression load between the components, thereby preventing the adjacent components from separating. The retaining ring includes a pair of arcuate interlocking members having a first end, a second end, an inner wall and an outer wall. The outer wall includes a first surface and the inner wall includes a second surface thereby defining a thickness between the first surface and the second surface. The inner wall also includes a third surface thereby defining a thickness between the third surface and the first surface, wherein the thickness between the third surface and the first surface is less than the thickness between the second surface and the first surface. The inner wall also includes a fourth surface joining the second surface and the third surface to define a smooth transition therebetween. The intersection of the second surface with the fourth surface defines a first inflection point and the intersection of the third surface with the fourth surface defines a second inflection point. The first end includes an outer latching profile having a first back angle, and the second end includes an inner latching profile having a second back angle. The retaining ring may also include a two part load ring having a pair of arcuate retaining members having an inner wall and an outer wall. The pair of arcuate retaining members may include a groove in the outer wall to receive the pair of arcuate interlocking members. A method of transferring compression loads between adjacent tubular components is also disclosed.

26 Claims, 5 Drawing Sheets

U.S. PATENT DOCUMENTS

| | | |
|---|---|---|
| 4,326,737 | 4/1982 | Lehmann . |
| 4,405,161 | 9/1983 | Young et al. . |
| 4,612,680 | 9/1986 | Daiguji . |
| 4,771,516 | 9/1988 | Foth . |
| 4,795,197 | 1/1989 | Kaminski et al. . |
| 5,007,666 | 4/1991 | Kyfes . |
| 5,358,283 | 10/1994 | Silva . |
| 5,462,312 | 10/1995 | Carpenter et al. . |
| 5,573,290 | 11/1996 | Smith . |
| 5,575,580 | 11/1996 | Parrish et al. . |
| 5,586,832 | 12/1996 | Zylka . |

RETAINING RING

RELATED APPLICATIONS

This application claims the benefit of U.S. Provisional Application No. 60/079,644, filed Mar. 27, 1998.

BACKGROUND OF THE INVENTION

1. Field of the Invention

The present invention relates to a retaining ring for securing components along a shaft by transferring the compression load between adjacent components. Preferably, the retaining ring is used for securing together the components of a bottom hole assembly by preventing the adjacent components from separating, by transferring the axial and radial compression load between connected components of a bottom hole assembly and a tubing, and by transferring the compression load between connected components of the bottom hole assembly as part of a quick disconnect coupler.

2. Description of the Related Art

Conventional retaining rings have open ended spring rings having a relatively small gap between their open ends. In assembling such rings, they are spread over the end of a shaft and shifted along the shaft in an axial direction until they reach the plane of the shaft groove provided for their reception, into which they spring seat themselves. Other conventional retaining rings are capable of being inserted directly over the shaft in the plane of the groove, i.e., in a plane perpendicular to the axis of the shaft. Still other retaining rings have been proposed, such as one which has two arcuate sections adapted to engage together by connecting male-female flanges on the ends of the arcuate separable sections. Another retaining ring has two separable parts having interlocking grooves and hooked tongues to interlock with one another. All of these have noticeable deficiencies. Most notably, the installation and removal of these retaining rings requires a great deal of force, making the retaining ring very difficult to install and remove. Further, because of the large amount of force required to install and remove these retaining rings, it is highly likely that the retaining ring will be deformed, thereby preventing its re-use. Also, all of these retaining rings are deficient in their ability to remain secured to the shaft when subjected to heavy thrust loads or forces as compared to the retaining ring of the present invention. Furthermore, all of these retaining rings lack the ability to remain secured to the shaft when subject to high radial forces against the arcuate members such as during high rotational speed application, or direct loading.

Accordingly, prior to the development of the present invention, there has been no retaining ring and method of transferring compression loads between adjacent tubular components which: provides easy installation and removal; remains secured to the shaft when subjected to heavy thrust loads; remains secured to the shaft when subjected to axial load compressions; and remains secured to the shaft when subjected to high radial forces, such as those which occur during high rotational speed applications. Therefore, the art has sought a retaining ring and method of transferring compression loads between adjacent tubular components which: provides easily installation and removal; remains secured to the shaft when subjected to heavy thrust loads; remains secured to the shaft when subjected to axial load compressions; and remains secured to the shaft when subjected to high radial forces, such as those which occur during high rotational speed applications.

SUMMARY OF THE INVENTION

In accordance with the present invention the foregoing advantages have been achieved through the present retaining ring. In a broad aspect, the invention is a retaining ring comprising a pair of arcuate interlocking members. Each arcuate interlocking member includes a first end, a second end, an inner wall and an outer wall. The outer wall includes a first surface and the inner wall includes a second surface thereby defining a thickness between the first surface and the second surface. The inner wall also includes a third surface thereby defining a thickness between the third surface and the first surface, wherein the thickness between the third surface and the first surface is less than the thickness between the second surface and the first surface. The inner wall also includes a fourth surface joining the second surface and the third surface to define a smooth transition therebetween. The second surface intersects the fourth surface thereby defining a first inflection point and the third surface intersects the fourth surface thereby defining a second inflection point. The first end includes an outer latching profile having a first back angle; and the second end includes a female interlocking flange.

A further feature of the retaining ring is that the retaining ring may include a two part load ring having a pair of arcuate retaining members, each arcuate retaining member having an inner wall and an outer wall. Another feature is that the pair of arcuate retaining members may include a groove in the outer wall of the arcuate retaining member to receive the pair of arcuate interlocking members. An additional feature is that the female interlocking flange may include an inner supported beam and an inner latching profile. A further feature is that the inner latching profile may include a second back angle. Another feature is that the first end of the arcuate interlocking member may include a first disassembly hole. An additional feature is that the arcuate interlocking member may include a second disassembly hole. A further feature is that the second disassembly hole may be positioned intermediate between the first end and the second end of the arcuate interlocking member. Another feature is that the thickness between the first surface and the second surface may be constant. An additional feature is that the thickness between the second surface and the fourth surface may be constant. A further feature is that the inner wall may include an inner latching base portion joining the second surface with the second end, the second surface intersecting the inner latching base portion thereby defining a third inflection point. Another feature is that the inner latching base portion of the inner wall defines a substantially straight line.

In accordance with the present invention the foregoing advantages have also been achieved through the present retaining ring comprising a pair of arcuate interlocking members. Each arcuate interlocking member includes a first end, a second end, an inner wall, an outer wall, an outer cantilever beam, a tapered cantilever beam, a body, and an inner supporting beam. The first end includes an outer latching profile, wherein the outer latching profile includes a first back angle. The second end includes an inner latching profile. The outer cantilever beam is positioned between the outer latching profile and the tapered cantilever beam. The tapered cantilever beam is positioned between the outer cantilever beam and the body. The body is positioned between the tapered cantilever beam and the inner supporting beam, and the inner supporting beam is positioned between the body and the inner latching profile.

A further feature of the retaining ring is that the retaining ring may include a two part load ring having a pair of arcuate retaining members, each arcuate retaining member having an inner wall and an outer wall. Another feature is that the pair of arcuate retaining members may include a groove in the outer wall of the arcuate retaining members to receive the pair of arcuate interlocking members. An additional feature is that the inner latching profile may include a second back angle. A further feature is that the first end of the arcuate interlocking member may include a first disassembly hole. Another feature is that the arcuate interlocking member may include a second disassembly hole. An additional feature is that the second disassembly hole may be positioned intermediate between the first end and the second end of the arcuate interlocking member. A further feature is that the thickness between the inner wall and the outer wall of the body may be constant and the thickness between the inner wall and the outer wall of the outer cantilever beam may be constant and less than the thickness between the inner wall and the outer wall of the body. An additional feature is that the thickness between the inner wall and the outer wall of the tapered cantilever beam maybe variable, thereby providing a smooth transition between the body and the outer cantilever beam.

In accordance with the present invention the foregoing advantages have also been achieved through the present method for a transferring compression load between adjacent tubular components. The method of the present invention includes the steps of: providing two tubular components; connecting the tubular components and providing an annular space between the tubular components; providing a retaining ring, wherein the retaining ring includes a pair of arcuate interlocking members having a first end and a second end, the first end having a first back angle and the second end having a second back angle; and interlocking the retaining ring within the annular space by engaging the first end of an arcuate interlocking member and the second end of an arcuate interlocking member, thereby allowing the compression load to be transferred between adjacent tubular components.

The retaining ring and method of transferring compression loads between adjacent tubular components, when compared with previously proposed prior art retaining rings and methods of transferring compression loads between adjacent tubular components have the advantages of: providing easy installation and removal of the retaining ring; remaining secured to the shaft when subjected to heavy thrust loads; remaining secured to the shaft when subjected to axial load compressions; and remaining secured to the shaft when subjected to high radial forces, such as those which occur during high rotational speed applications.

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE INVENTION

The invention relates to a retaining ring comprising a pair of arcuate interlocking retaining members and method of transferring compression loads between adjacent tubular components. The primary use of the retaining ring is as a radial clamp which after installation provides transference of compression forces, or loads, between adjacent tubular components in an axial direction. A "tubular component" is herein defined as any cylindrical device, including but not limited to devices such as pipes, downhole tools, tubing, and shafts. "Adjacent tubular components" are herein defined as a plurality of tubular components attached to, or connected with, each other by any method known to persons skilled in the art, wherein it is desired, or necessary, to transfer the compression load between the tubular components.

In a specific embodiment of the invention, the retaining ring of the invention is used to transfer the compression load between adjacent components of a bottom hole assembly. A bottom hole assembly (commonly referred to in the industry as a "BHA") for drilling wells with coiled tubing comprises various constituent parts which may include: a drill bit; a bent sub for changing the vertical angle of penetration; a motor for rotating the bit; a circulating sub for flowing drilling mud to prevent sticking of the BHA in the well; an orienting tool for changing the direction of penetration; a thruster for providing weight on the bit; and a sub which provides a means for selectively attaching and releasing the BHA from the coiled tubing. The present invention is directed to a device which is a significant improvement over the prior art for providing transfer of compression loads between the individual components of the BHA and the coiled tubing by using the present invention in connection with a quick disconnect coupler.

Figure 1:
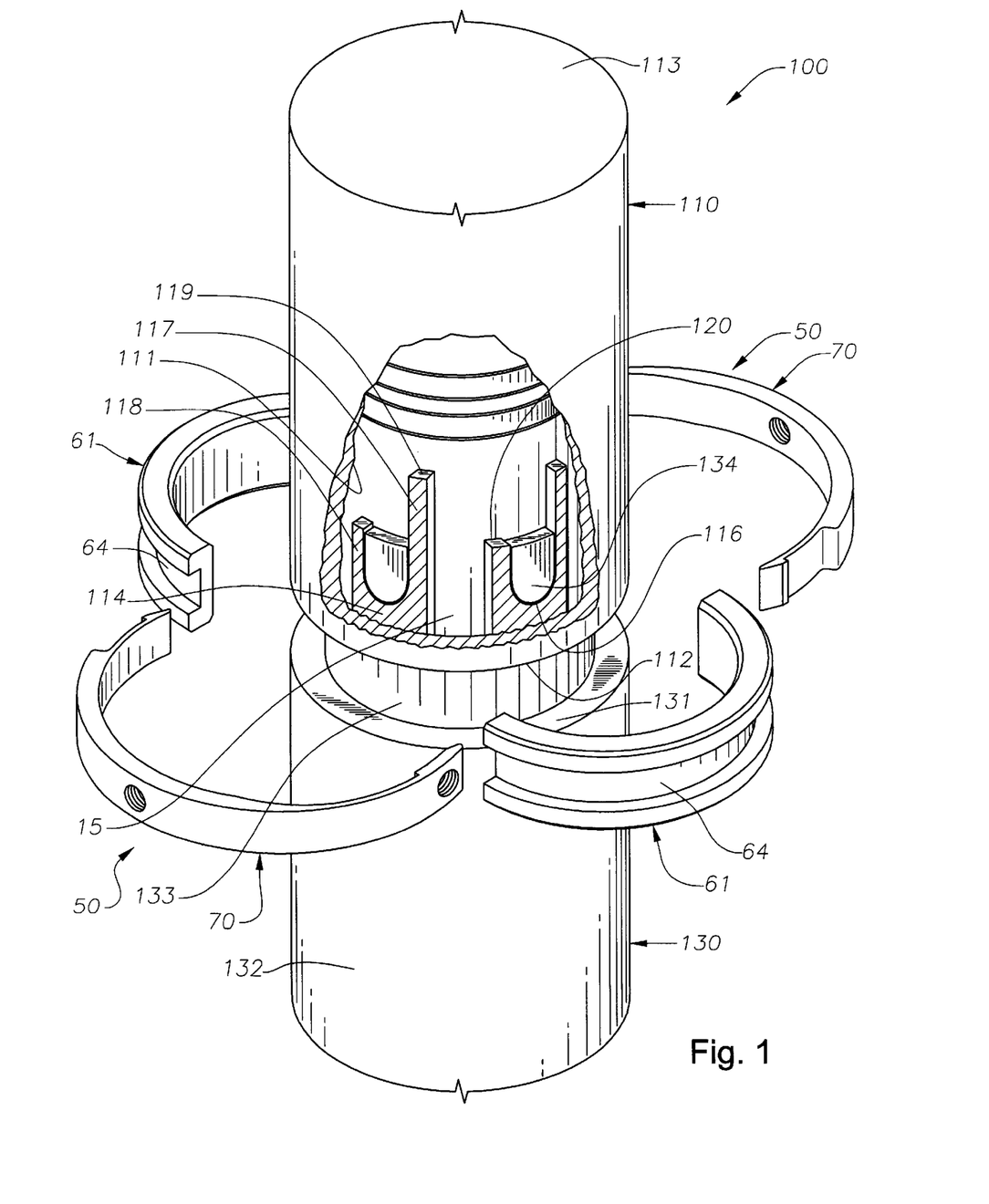
FIG. 1 illustrates an exploded, perspective view of a specific embodiment of a retaining ring of the present invention used in connection with a quick disconnect coupler as used with a bottom hole assembly.

Referring now to the drawings, wherein like numerals denote identical elements throughout the several views, FIGS. 1–6 show specific embodiments of the present invention. As illustrated in FIG. 1, in a broad aspect, the quick disconnect coupler 100 includes a box (or female) connector 110, a pin (or male) connector 130, and a retaining ring 50 composed of two arcuate retaining members 61 and two arcuate interlocking members 70. The arcuate retaining member 61 and the arcuate interlocking member 70 may be constructed out of any suitable material which provides the desired strength characteristics, such as steel, stainless steel, spring steel, titanium, inconel, and aluminum. The arcuate retaining member 61 and the arcuate interlocking member 70 are preferably constructed out of inconel or spring steel.

As illustrated in FIG. 1, the box/female connector 110 includes a longitudinal bore 111 extending therethrough, a first end 112, and a second end 113. At the first end 112 of the box/female connector 110, the longitudinal bore 111 includes a plurality of ribs 114 that are preferably evenly spaced about the circumference of the longitudinal bore 111, and a plurality of grooves 115 defined between the ribs 114. Each rib 114 includes a recess 116 disposed between a first leg 117 and second leg 118. The first leg 117 includes a distal end 119 and the second leg 118 includes a distal end 120.

The distal end 120 of the second leg 118 is located closer to the first end 112 of the box/female connector 110 than is the distal end 119 of the first leg 117.

As further illustrated in FIG. 1, the pin/male connector 130 includes a shoulder 131 adjacent a main body portion 132 and a pin member 133. The pin member 133 includes a plurality of lugs 134 for mating with the recesses 116 in the ribs 114 on the box/female connector 110, as will be more fully explained below. The purpose of the quick disconnect coupler 100 is to enable various downhole tools, such as the individual component tools that make up a BHA (not shown), to be quickly and efficiently connected and disconnected. The quick disconnect coupler 110 achieves this purpose by connecting, as by threads, the box/female connector 110 to one end of a first tool (not shown) and the pin/male connector 130 to a mating end of a second tool (not shown). Once the tools that are desired to be connected are equipped with the connectors 110 and 130, the tools may be quickly connected by: (1) sliding the lugs 134 on the pin/male connector 130 into the grooves 115 on the box/female connector 110 until the shoulder 131 on the pin/male connector 130 abuts against the first end 112 of the box/female connector 110, and the lugs 134 extend past the distal ends 120 of the second legs 118 of the ribs 114; (2) rotating the pin/male connector 130 a fraction of a full 360 degree turn until the lugs 134 contact the first legs 117 on the ribs 114 and are positioned adjacent their corresponding recesses 116; (3) sliding the lugs 134 into their corresponding recesses 116; (4) fastening two arcuate retaining members 61 around the pin member 133, and between the shoulder 131 on the pin/male connector 130 and the first end 112 of the box/female connector 110; and (5) fastening, or interlocking, the two arcuate interlocking members 70 around the two arcuate retaining members 61, and within the groove 64 of the two arcuate retaining members 61. The two arcuate retaining members 61 and the two arcuate interlocking members 70 prevent the lugs 134 from exiting the recesses 116 and also transmit compressive loads through the connection. The lugs 134 and ribs 114 transmit all tensile and torque forces through the connection. As noted above, this connection allows minimal rotation of parts being assembled, eases and quickens repair or replacement of components, provides a universal profile to simplify custom configurations, and enables a beneficial modularity whereby specific devices may be added, removed, or changed in relative position in the BHA.

Figure 2:
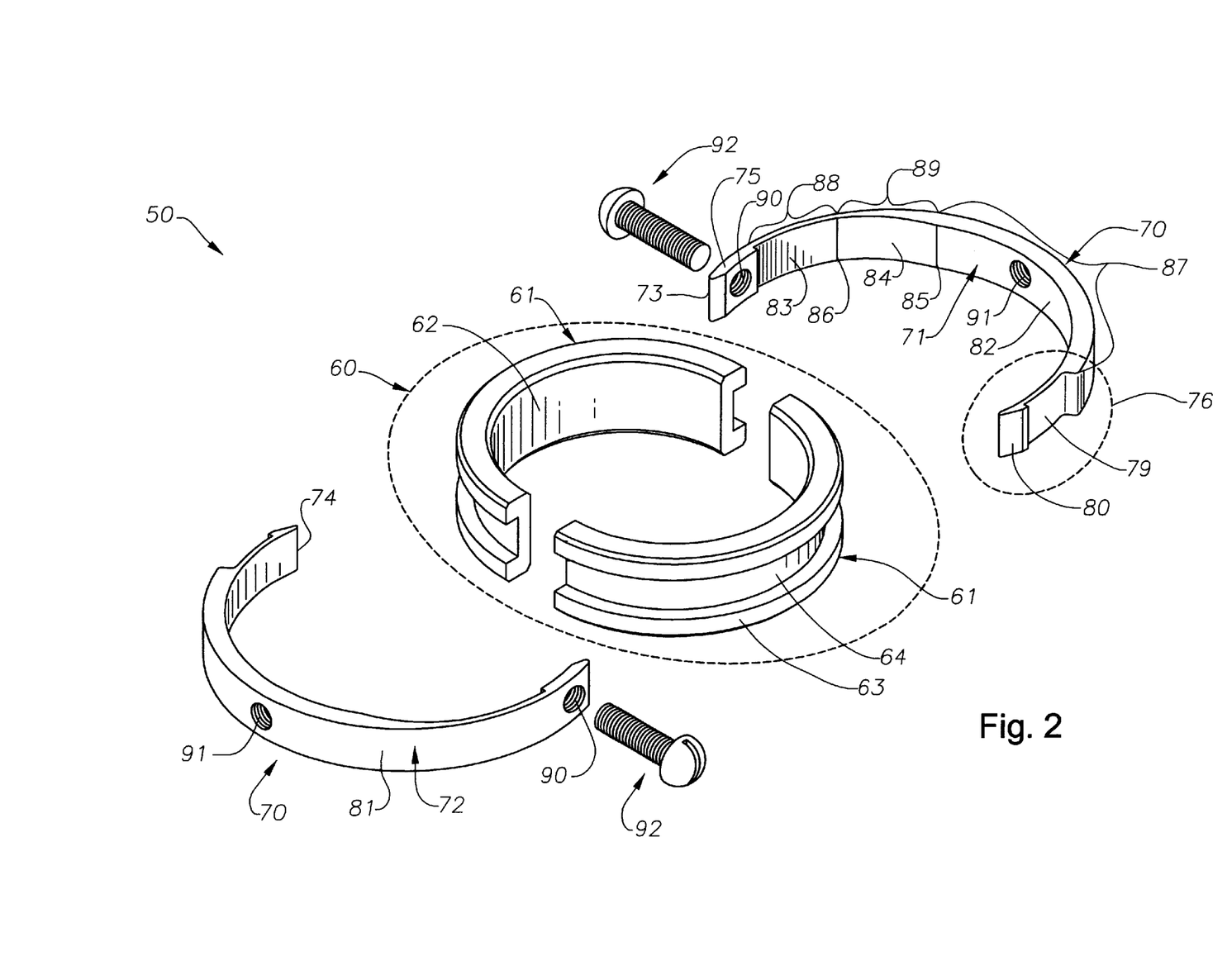
FIG. 2 is an exploded, perspective view of the specific embodiment of the retaining ring of the present invention of FIG. 1.
Figure 3:
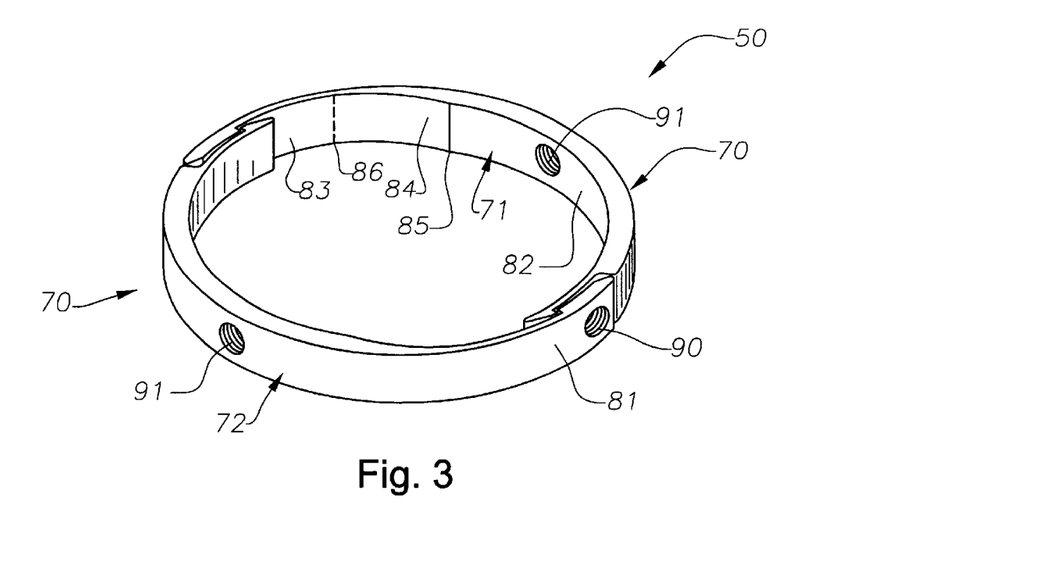
FIG. 3 is a perspective view of a specific embodiment of the retaining ring of the present invention in its locked position.
Figure 4:
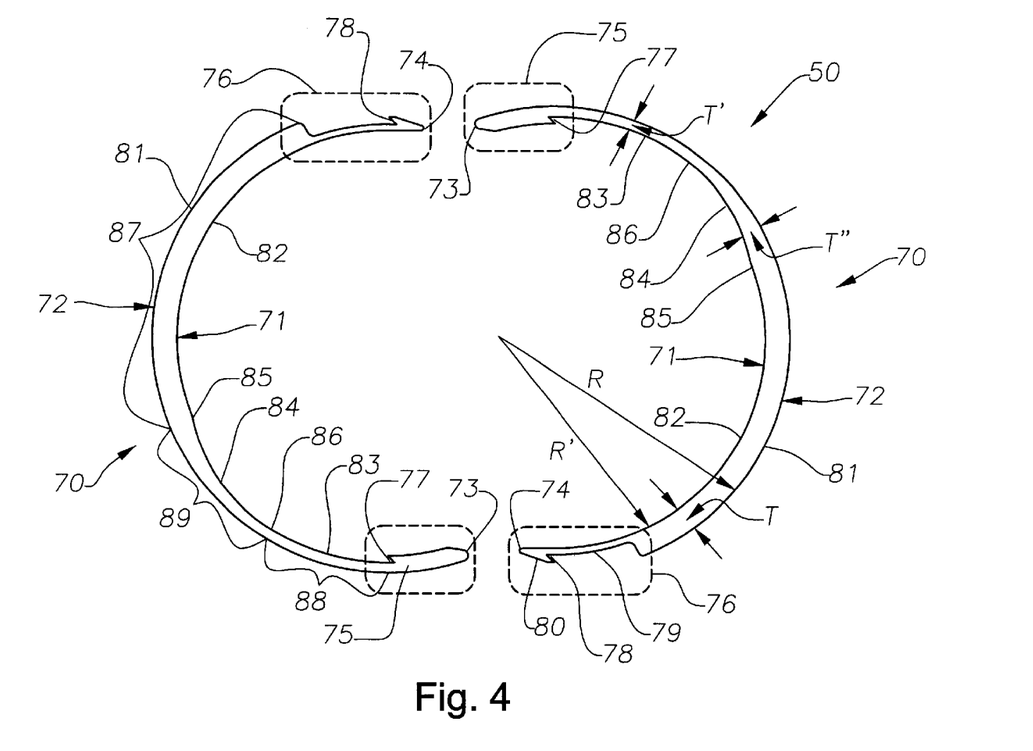
FIG. 4 is a top view of a specific embodiment of the retaining ring of the present invention of FIG. 3 in its unlocked position.

Referring now to FIGS. 1 and 2, the retaining ring 50 may include a load ring 60, having two arcuate retaining members 61, each having an inner wall 62, and an outer wall 64. Outer wall 64 of the two arcuate retaining members 61, includes a groove, or annular recess, 64 which may receive the arcuate interlocking members 70 when the arcuate interlocking members 70 are in the locked position (FIG. 3).

Referring now to FIGS. 3–6, in one specific embodiment of the invention, retaining ring 50 without arcuate retaining members 61, includes two arcuate interlocking members 70, each arcuate interlocking member 70 having an inner wall 71, an outer wall 72, a first end 73, and a second end 74. The first end 73 and the second end 74 are preferably rounded to facilitate the smooth sliding of one arcuate interlocking member 70 over the other arcuate interlocking member 70.

The outer wall 72 includes a first surface 81 having a constant radius of curvature R. Preferably, the first surface 81 of the outer wall 72 is smooth, thereby preventing the outer wall 72 from snagging on other surfaces or objects which may pass along the first surface 81, such as the casing wall of an oil well. The inner wall 71 includes a second surface 82, a third surface 83, and a fourth surface 84, as will be hereinafter be described in greater detail. The second surface 82 defines a thickness T between the first surface 81 and the second surface 82. Preferably, the thickness T between the first surface 81 and the second surface 82 is a constant radius of curvature R'. A body portion, or body, 87 of arcuate interlocking member 70 is defined by second surface 82 and that portion of first surface 81 oppositely disposed from second surface 82. Thickness T is the distance between first surface 81 and second surface 82, i.e, the thickness of the body 87. The length of the arcuate interlocking member 70 defined by the first surface 81 of the outer wall 72 and the second surface 82 of the inner wall 71 is the body 87 of the arcuate interlocking member 70. While it is to be understood that the length of arcuate interlocking member 70 which forms the body 87 may be any length desired, or required, to optimize the performance of the retaining ring 50, preferably the length of the body 86 is at least about 30 to about 70% of the total length of the arcuate interlocking member 70.

The third surface 83 defines a thickness T' between the third surface 83 and the first surface 81 which is less than the thickness T between the first surface 81 and the second surface 82. Preferably, the thickness T' between the first surface 81 and the third surface 83 is constant. A cantilever beam portion, or cantilever beam, 88 of arcuate interlocking member 70 is defined by third surface 83 and that portion of first surface 81 oppositely disposed from third surface 83. Thickness T' is the distance between first surface 81 and third surface 83, i.e, the thickness of the cantilever beam 88. While it is to be understood that the length of arcuate interlocking member 70 which forms the cantilever beam 88 may be any length desired, or required, to optimize performance of the retaining ring 50, preferably the length of the cantilever beam 88 is at least about 10 to about 30% of the total length of the arcuate interlocking member 70.

The cantilever beam 88 of the arcuate interlocking member 70 allows the maximum distribution of stress through the cantilever beam 88. The even distribution allows the highest amount of energy to be stored in the cantilever beam 88. Therefore, the clamping force of the arcuate interlocking member 70 at a given deflection is maximized, as is the fatigue life of the arcuate interlocking member 70. The stress at a given force is also minimized. Preferably, the thickness T' of the cantilever beam 88 is at least about 30 to about 70% of the thickness of the body 87 of the arcuate interlocking member 70. While it is to be understood that the thickness T' of the cantilever beam 87 may be any thickness desired, or required, to optimize performance of the retaining ring 50, preferably the thickness T' of the cantilever beam 88 is about 50% of the thickness T of the body 87 of the arcuate interlocking member 70.

The fourth surface 84 cormects the second surface 82 and the third surface 83 thereby defining a smooth transition between the second surface 82 and the third surface 83. A tapered cantilever beam portion, or cantilever beam, 89 of arcuate interlocking member 70 is defined by fourth surface 84 and that portion of first surface 81 oppositely disposed from fourth surface 84. While it is to be understood that the length of arcuate interlocking member 70 which forms the tapered cantilever beam 89 may be any length desired, or required, to optimize the performance of the retaining ring 50, preferably the length of the tapered cantilever beam 89 is at least about 10 to 30% of the total length of the arcuate interlocking member 70.

The second surface 82 intersects the fourth surface 84 thereby defining a first inflection point 85. The third surface 83 intersects the fourth surface 84 thereby defining a second inflection point 86. An "inflection point" is herein defined as the location on the inner wall 71 of the arcuate interlocking member 70 where the curve or arc of the inner wall 71 of the arcuate interlocking member 70 changes from convex to concave, such as first inflection point 85, and from concave to convex, such as second inflection point 86.

The thickness T" between the fourth surface 84 and the first surface 81 is variable. In a preferred embodiment, the thickness T" between the first surface 81 and the fourth surface 84 at the first inflection point 85 is greater than the thickness T" between the first surface 81 and the fourth surface 84 at the second inflection point 86. This allows for a smooth distribution of stress into the body 87 of the arcuate interlocking member 70. This distribution serves to minimize stress concentrations which will lead to deformation or failure at the point where the tapered cantilever beam 89 and the body 87 merge.

Figure 5:
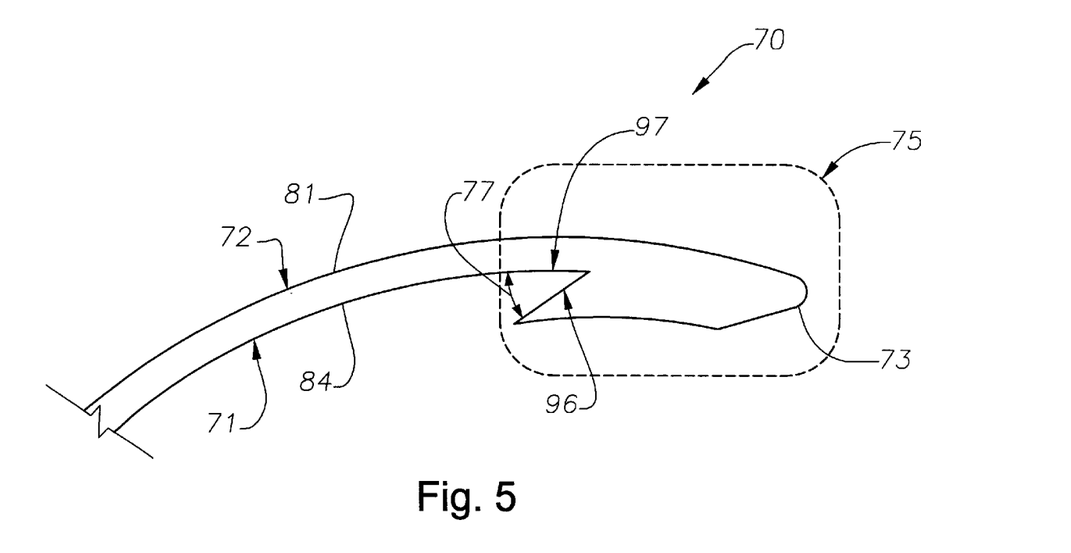
FIG. 5 is a detailed view of the male interlocking flange of the retaining ring of the present invention of FIGS. 1–4.
Figure 6:
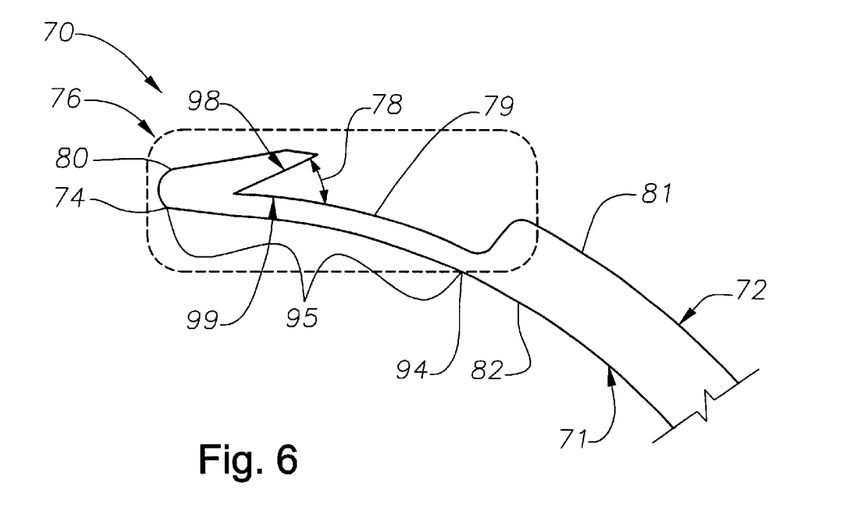
FIG. 6 is a detailed view of the female interlocking flange of the retaining ring of the present invention of FIGS. 1–4.

Still with reference to FIGS. 3–6, and in particular FIGS. 5 and 6, each arcuate interlocking member 70 includes a male interlocking flange, or outer latching profile, 75 located at the first end 73 and an female interlocking flange 76 located at the second end 74. The outer latching profile 75 includes a wall surface 96 which is disposed at an angle, or first back angle, 77 with respect to an adjacent portion 97 of the fourth surface 84 of inner wall 71. First back angle 77 faces inwardly, toward body 87, i.e., away from first end 73. The female interlocking flange 76 includes an inner supporting beam 79 and an inner latching profile 80. The inner latching profile 80 includes a wall surface 98 which is disposed at an angle, or second back angle 78 with respect to an adjacent portion 99 of inner supporting beam 79 of the inner latching profile 80. The second back angle 78 faces outwardly, toward body 87, i.e. away from second end 74. While it is to be understood that the inner supporting beam 79 may be any thickness desired, or required, to optimize the performance of the retaining ring 50, preferably the inner supporting beam 79 has a constant thickness T'" ranging from at least about 10% to about 35% of the thickness T of the body 87.

The outer latching profile 75 interlocks with the inner latching profile 80 of the female interlocking flange 76 by sliding the outer latching profile 75 over the inner latching profile 80 so that the outer latching profile 75 is disposed above the inner supported beam 79 and the first back angle 77 and the second back angle 78 are engaged.

Referring now to FIG. 6, in a specific embodiment, the inner wall 71 of arcuate retaining member 70 may include an inner latching base portion 95 joining the second surface 82 with the second end 74, the second surface 82 intersecting with the inner latching base portion 95 thereby defining a third inflection point 94. The arc of the inner wall 71 at the third inflection point 94 changes from concave to substantially straight. The inner wall 71 from the third inflection point 94 to the second end 74 forms the inner latching base portion 95. The inner latching base portion 95 of the inner wall 71 from the third inflection point 94 to the second end 74 defines a substantially 5 straight line. Because the curvature of the inner wall 71 from the third inflection point 94 to the second end 74 has been changed, the arcuate interlocking member 70 is believed to be more easily assembled onto the tubular component (not shown). It is contemplated that this specific embodiment enhances the amount of stored energy in the inner latching profile 80. Accordingly, when the outer latching profile 75 (FIG. 5) is engaged with the inner latching profile 80, the inner latching profile 80 is forced into the outer latching profile 75, thereby increasing the engagement of the inner latching profile 80 and the outer latching profile 75, especially during high rotational speed applications.

The first back angle 77 and the second back angle 78 provide a secure mating engagement between the outer latching profile 75 and the inner latching profile 80. The first back angle 77 and the second back angle 78 should also provide balance between a secure engagement and the tolerances associated with the manufacture and installation of the arcuate interlocking members 70. If the first back angle 77 and the second back angle 78 are too large, the arcuate interlocking members will be allowed to move such that the engagement between the outer latching profile 75 and the inner latching profile 80 will not withstand heavy loads. Close tolerances ensure that the first back angle 77 and the second back angle 78 are sufficient to maintain engagement when subjected to heavy loads, while allowing secure, easy, installation by hand. The first back angle 77 and the second back angle 78 each are an acute angle. Preferably, the first back angle 77 and the second back angle 78 each range from at least about 30 degrees to about 90 degrees. Preferably, the first back angle 77 is equal to the second back angle 78, although they could vary.

First end 73 of each arcuate interlocking member 70 may include a first disassembly hole 90, thereby facilitating disengagement of the outer latching profile 75 and the inner latching profile 80. Preferably, the first disassembly hole 90 is threaded, thereby allowing a screw 92 (FIG. 2), or other threaded device, to be inserted into first disassembly hole 90 and assist in moving arcuate interlocking member 70 from the locked position (FIG. 3) to the unlocked position (FIG. 4), as will be hereinafter described in greater detail. Preferably, the first disassembly hole 90 is located in the outer latching profile 75 of the arcuate interlocking member 70.

Each arcuate interlocking member 70 may also includes a second disassembly hole 91, thereby facilitating disengagement of the outer latching profile 75 and the inner latching profile 80. Preferably, the second disassembly hole 91 is threaded, thereby allowing a screw 92 (FIG. 2), or other threaded device, to be inserted into second disassembly hole 91 and assist in removing the arcuate interlocking member 70 as will be hereinafter described in greater detail. The second disassembly hole 91 is located intermediate between the first end 73 of the arcuate interlocking member 70 and the second end 74 of the arcuate interlocking member. Preferably, the second disassembly hole 91 is located about equidistant between the first end 73 and the second end 74.

The first disassembly hole 90 and the second disassembly hole 91, and mating screw 92, allow the user to lift the outer cantilever beam 88, and thus disengage the outer latching profile 75 from the inner latching profile 80. By controlling the disassembly of the arcuate interlocking member 70 using the first disassembly hole 90 and the second disassembly hole 91 and screw 92, less stress is placed upon the outer cantilever beam 88 because a known number of screw rotations may lift the outer latching profile 75 in a calibrated manner, thereby preventing the arcuate interlocking member 70 from becoming deformed. Accordingly, the arcuate interlocking member 70 may be reused. The first disassembly hole 90 and the second disassembly hole 91 also allow the outer cantilever beam 88 to be thin, thereby optimizing the radial component of geometry, by controlling the stresses in the outer cantilever beam 88. The first disassembly hole 90 also lightens the outer latching profile 75, thereby reducing its inertial mass, increasing the clamping centripetal force during high rotational speed applications.

Figure 7:
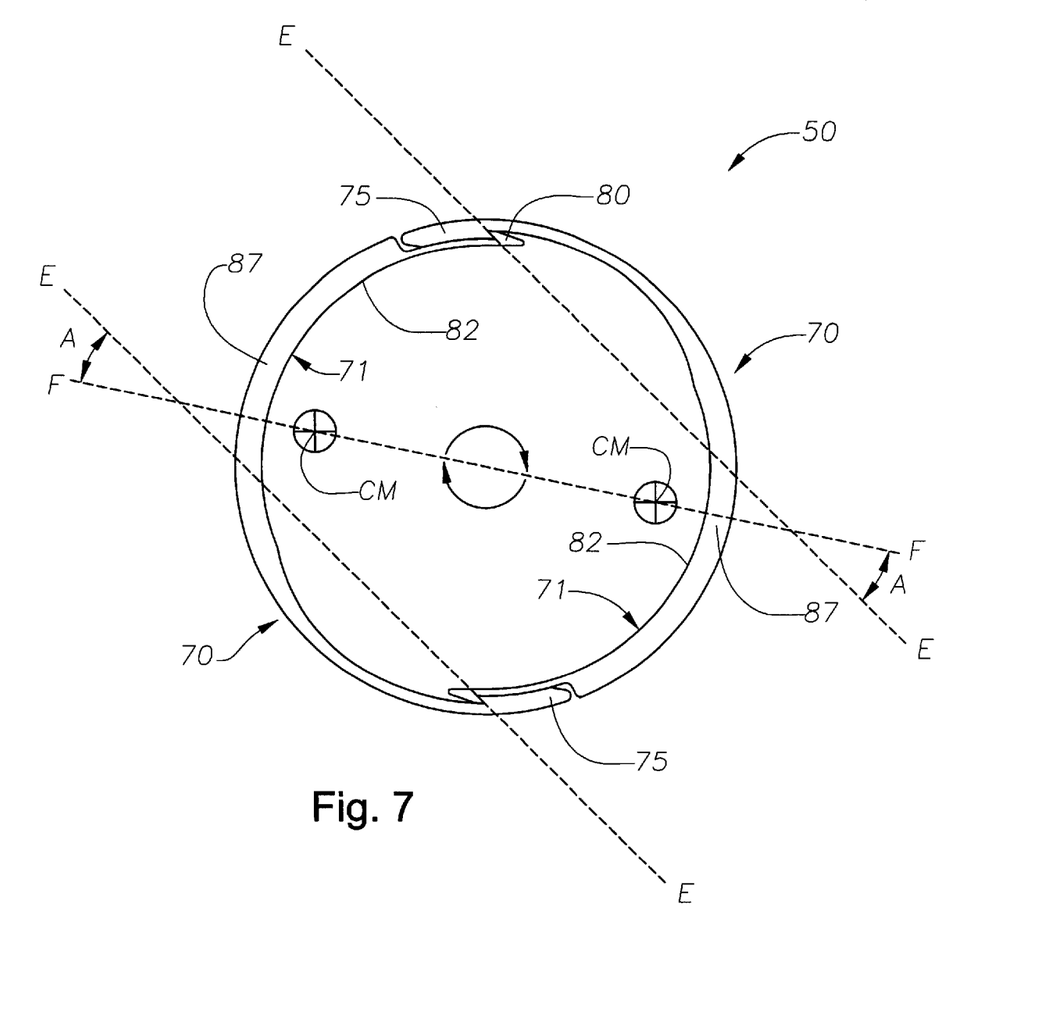
FIG. 7 is a top view of a specific embodiment of the retaining ring of the present invention of FIGS. 1–4 in its locked position.

Referring now to FIG. 7, the arcuate interlocking member 70 has its center of rotational mass, or center of mass, CM located such that rotational forces will act on the body 87 of the arcuate 25 interlocking member 70 in a direction which will draw the outer latching profile 75 inward, effectively increasing the latching force and engagement as the rotational forces increase. The center of mass CM causes a force to act on the body 87 of the arcuate interlocking member 70 in a direction which is never outside a perpendicular line to the angle of engagement of the first back angle 77 and the second back angle 78. The angle of engagement, as illustrated by line EE, is determined by the first back angle 77 and the second back angle 78 as described above. The rotational force passes through the center of mass CM as illustrated by line FF. The intersection of the direction of rotational force FF with line EE, forms an angle A which is less than 90 degrees. This increases the ability of the retaining ring 50 to withstand extreme rotational speeds and radial point loading. The surface contact of the tubular component (not shown) on the second surface 82 of the inner wall 71 of the arcuate interlocking member 70 also directs point loading in a direction which will tend to increase the latching force by avoiding load points that would lift the outer latching profile 75 while supporting the inner latching profile 80. By moving the center of mass CM to a centralized area, away from the first end 73 and the second end 74, the expanding forces of the arcuate interlocking member 70 can be minimized while the forces engaging the outer latching profile 75 and the inner latching profile 80 are maximized.

Additionally, the center of mass CM of the arcuate interlocking member 70 is located away from the inner latching profile 80 and the outer latching profile 75. This enables the rotational forces to increase engagement between the inner latching profile 80 and the outer latching profile 75, without the outer latching profile 75 acting to expand the arcuate interlocking member 70 and disengage the outer latching profile 75 from the inner latching profile 80. The center of mass CM is located closer to the inner latching profile 80 to encourage latching force toward the interface between the inner latching profile 80 and the outer latching profile 75.

The inner latching profile 80 and the outer latching profile 75 have tolerances such that the outer latching profile 75 will not interface with the inner supported beam 79 of the female interlocking flange 76. Instead, the inner latching profile 80 is drawn up into the first back angle 77 of the outer latching profile 75, thus maximizing the engagement between the inner latching profile 80 and the outer latching profile 75 under load. The rotational force, or load, acts to rotate the outer latching profile 75 outwardly. The second back angle 78 of the inner latching profile 80 resists the rotating movement by drawing the inner latching profile 80 further into the outer latching profile 75 and by increasing retention of the outer latching profile 75 in the radial direction. The inner latching profile 80 and the outer latching profile 75 are manufactured to be under load during static assembly to ensure the engagement of the first back angle 77 and the second back angle 78.

In another specific embodiment of the invention, load is transferred through adjacent tubular components. The method of the present invention includes providing two tubular components. The tubular components are connected to provide an annular space between the tubular components. A retaining ring previously described is placed within the annular space by engaging the first end of an arcuate interlocking member and the second end of an arcuate interlocking member. As a result of the placement of the retaining ring within the annular space, the compression load is capable of being transferred between the tubular components.

It is to be understood that the invention is not limited to the exact details of construction, operation, exact materials or embodiments shown and described, as obvious modifications and equivalents will be apparent to one skilled in the art. For example, in addition to using the retaining ring of the invention in transferring the compression load between components of the BHA, the device 50 may also be advantageously used in combination with other downhole well tools, or with other pipes, conduits, or any other cylindrical member to transfer the compression load between two or more adjacent pipes, conduits, or other cylindrical member. The retaining ring of the invention may also be used in any application in which it is desired or necessary to securely apply a radial clamp around a tubular component at a specified location along the tubular component. Accordingly, the invention is therefore to be limited only by the scope of the appended claims.

What is claimed is:

1. A retaining ring comprising:
   a pair of arcuate interlocking members, each arcuate interlocking member having a first end, a second end, an inner wall and an outer wall;
   the outer wall having a first surface and the inner wall having a second surface thereby defining a thickness between the first surface and the second surface;
   the inner wall having a third surface thereby defining a thickness between the third surface and the first surface, wherein the thickness between the third surface and the first surface is less than the thickness between the second surface and the first surface;
   the inner wall having a fourth surface joining the second surface and the third surface, the thickness between the fourth surface and the first surface gradually decreasing from the second surface to the third surface to define a smooth transition therebetween;
   the second surface intersecting the fourth surface thereby defining a first inflection point and the third surface intersecting the fourth surface thereby defining a second inflection point;
   the first end including an outer latching profile having a first back angle; and the second end including a female interlocking flange.

2. The retaining ring of claim 1, wherein the retaining ring includes a two part load ring having a pair of arcuate retaining members, each arcuate retaining member having an inner wall and an outer wall.

3. The retaining ring of claim 2, wherein the pair of arcuate retaining members include a groove in the outer wall of the arcuate retaining member to receive the pair of arcuate interlocking members.

4. The retaining ring of claim 1, wherein the female interlocking flange includes an inner supported beam and an inner latching profile.

5. The retaining ring of claim 4, wherein the inner latching profile includes a second back angle.

6. The retaining ring of claim 1, wherein the first end of the arcuate interlocking member includes a first disassembly hole.

7. The retaining ring of claim 6, wherein the arcuate interlocking member includes a second disassembly hole.

8. The retaining ring of claim 7, wherein the second disassembly hole is positioned intermediate between the first end and the second end of the arcuate interlocking member.

9. The retaining ring of claim 1, wherein the thickness between the first surface and the second surface is constant.

10. The retaining ring of claim 1, wherein the thickness between the first surface and the fourth surface is variable.

11. The retaining ring of claim 1, wherein the inner wall includes an inner latching base portion joining the second surface with the second end, the second surface intersecting the inner latching base portion thereby defining a third inflection point.

12. The retaining ring of claim 11, wherein the inner latching base portion of the inner wall defines a substantially straight line.

13. The retaining ring of claim 2, wherein the first end of the arcuate interlocking member includes a first disassembly hole.

14. The retaining ring of claim 13, wherein the arcuate interlocking member includes a second disassembly hole.

15. The retaining ring of claim 14, wherein the second disassembly hole is positioned intermediate between the first end and the second end of the arcuate interlocking member.

16. A retaining ring comprising:
a pair of arcuate interlocking members, each arcuate interlocking member having a first end and a second end, an inner wall and an outer wall, an outer cantilever beam, a tapered cantilever beam, a body, and an inner supporting beam;
the first end having an outer latching profile, wherein the outer latching profile includes a back angle;
the second end having an inner latching profile;
the outer cantilever beam being positioned between the outer latching profile and the cantilever beam;
the tapered cantilever beam being positioned between the outer cantilever beam and the body, the thickess of the tapered cantilever beam gradually decreasing from the body to the outer cantilever beam to define a smooth transition along the inner wall;
the body being positioned between the tapered cantilever beam and the inner supporting beam; and
the inner supporting beam being positioned between the body and the inner latching profile.

17. The retaining ring of claim 16, wherein the retaining ring includes a two part load ring having a pair of arcuate retaining members, each arcuate retaining member having an inner wall and an outer wall.

18. The retaining ring of claim 17, wherein the pair of arcuate retaining members include a groove in the outer wall of the arcuate retaining members to receive the pair of arcuate interlocking members.

19. The retaining ring of claim 16, wherein the inner latching profile includes a second back angle.

20. The retaining ring of claim 16, wherein the first end of the arcuate interlocking member includes a first disassembly hole.

21. The retaining ring of claim 20, wherein the arcuate interlocking member includes a second disassembly hole.

22. The retaining ring of claim 21, wherein the second disassembly hole is positioned intermediate between the first end and the second end of the arcuate interlocking member.

23. The retaining ring of claim 16, wherein the thickness between the inner wall and the outer wall of the body is constant.

24. The retaining ring of claim 16, wherein the thickness between the inner wall and the outer wall of the outer cantilever beam is constant and is less than the thickness between the inner wall and the outer wall of the body.

25. The retaining ring of claim 16, wherein the thickness between the inner wall and the outer wall of the tapered cantilever beam is variable thereby providing a smooth transition between the body and the outer cantilever beam.

26. A method of transferring a compression load between adjacent tubular components comprising the steps of:
providing two tubular components;
connecting the tubular components and providing an annular space between the tubular components;
providing a retaining ring, wherein the retaining ring includes a pair of arcuate interlocking members having a first end and a second end, the first end having a first back angle and the second end having a second back angle; and
interlocking the retaining ring within the annular space by engaging the first end of an arcuate interlocking member and the second end of an arcuate interlocking member, thereby allowing the compression load to be transferred between adjacent tubular components.

* * * * *